United States Patent [19]

Bradshaw et al.

[11] 4,261,707
[45] Apr. 14, 1981

[54] PROCESS AND SYSTEM FOR ELIMINATION OF PAINT SOLVENT VAPORS

[75] Inventors: Norman F. Bradshaw, Surrey; Ivan Bloomer, London, both of England

[73] Assignee: Schweitzer Industrial Corp., Madison Heights, Mich.

[21] Appl. No.: 74,647

[22] Filed: Sep. 12, 1979

[51] Int. Cl.³ .................. B01D 19/00; B01D 47/00
[52] U.S. Cl. ............................ 55/48; 55/50; 55/52; 55/55; 55/56; 55/68; 55/85; 55/89; 55/171; 55/195; 55/200; 55/201; 55/222; 55/223; 55/227; 55/228; 55/229; 55/238; 55/240; 55/257 PV; 55/DIG. 46; 98/115 SB; 118/61; 118/64; 118/326; 118/DIG. 7
[58] Field of Search ............... 55/171, 195, 222–223, 55/227–229, 48, 50, 52, 55–56, 68, 85, 89, 200–201, 238, 240, 257 PV, DIG. 46; 98/115 SB; 118/61, 64, 326, 603, 634, DIG. 7

[56] References Cited

U.S. PATENT DOCUMENTS

| | | |
|---|---|---|
| 1,305,180 | 5/1919 | Throop ................. 98/115 SB X |
| 1,502,844 | 7/1924 | Bingman . |
| 1,520,267 | 12/1924 | Waltz . |
| 2,227,481 | 1/1941 | Bates . |
| 2,805,844 | 9/1957 | McMaster . |
| 2,848,353 | 8/1958 | Norris . |
| 3,035,507 | 5/1962 | Gresham . |
| 3,119,675 | 1/1964 | Gallagher ................. 55/223 X |
| 3,168,031 | 2/1965 | Wilhelmsson et al. . |
| 3,395,972 | 8/1968 | Hardison . |
| 3,421,293 | 1/1969 | Halls ..................... 55/223 |
| 3,516,230 | 6/1970 | Saubesty . |
| 3,750,622 | 8/1973 | Repp et al. . |
| 3,807,291 | 4/1974 | Roberts et al. . |
| 3,876,399 | 4/1975 | Saponaro . |
| 3,932,151 | 1/1976 | Lau . |
| 3,967,942 | 7/1976 | Pain et al. . |
| 3,981,694 | 9/1976 | Hultgren et al. . |
| 4,045,524 | 8/1977 | Bornert . |
| 4,054,429 | 10/1977 | Ostojic et al. . |
| 4,055,404 | 10/1977 | Daimer . |
| 4,067,806 | 1/1978 | Mauceri . |
| 4,096,066 | 6/1978 | Kearney . |
| 4,100,066 | 7/1978 | Bloomer et al. ............... 210/44 |
| 4,101,297 | 7/1978 | Uda et al. . |
| 4,102,303 | 7/1978 | Cordier et al. . |

Primary Examiner—Kathleen J. Prunner
Attorney, Agent, or Firm—Krass, Young & Schivley

[57] ABSTRACT

A system and process is disclosed for eliminating paint solvents released during paint spraying operations into the circulated air including a liquid spray solvent stripper over which the exhaust air is passed, and a heating and cooling arrangement for regenerating the solvent absorber liquid. A heat exchanger recovering heat from an incinerator vaporizes the solvent and the absorber is recovered by being passed over cooling coils in a condensing chamber. The exhaust air is treated with a water circulation system to remove paint solids, a proportion of the solvent vapors passing into solution with the treatment water. A solvent stripper is provided consisting of an arrangement for applying a vacuum to the water circulated from a paint solid removal unit, causing the solvent to be vaporized out of solution, with the vapors condensed by being passed over cooling coils in a condensing chamber. The air and water stripper condensing chambers are purged by a vacuum pump directing the uncondensed solvent vapors into the incinerator.

21 Claims, 1 Drawing Figure

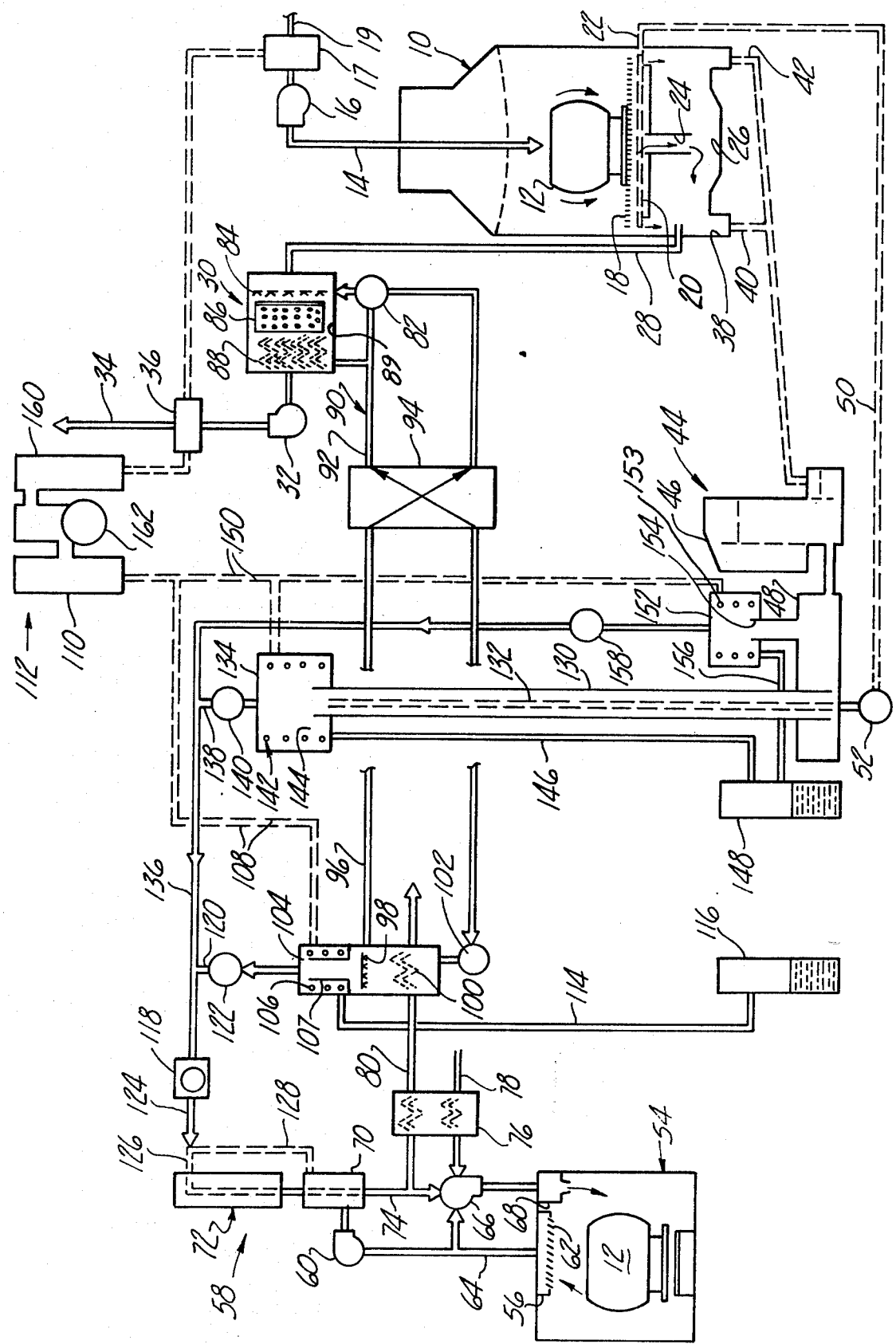

PROCESS AND SYSTEM FOR ELIMINATION OF PAINT SOLVENT VAPORS

BACKGROUND DISCUSSION

Recent trends have developed two major factors in the design of industrial facilities, i.e., the increasingly stringent governmental pollution control requirements, and the cost and availability of energy. Particularly difficult problems in this regard are found in the design of paint spray booth facilities for the application of paint to automative bodies and similar products, due to the enormous volumes of air flow required in the paint spray booths in industry.

The pollution problems are associated primarily with the hydrocarbon liquid constituents, including solvents, thinners and diluents of acrylic and lacquer paints and enamels. Such liquid constituents are vaporized during the paint application, as well as paint drying which vapors pass into air ciculated through the booth. Such air must be circulated at relatively high volume in order to enable the paint sprayers to work in a healthful and clean environment.

The rigorous standards of emissions applied to industrial facilities precludes the discharge of such hydrocarbon or solvent laden air directly into the atmosphere, and such vapors in the discharged air are required to be reduced to very low levels.

A common approach in eliminating such vapors which are combustible is to incinerate the same by passing the air into an incineration chamber which is heated by a burner to raise the temperature of the air sufficiently to cause oxidation of the hydrocarbons into carbon dioxide and water vapor prior to being exhausted by the atmosphere.

However, for the enormous air flow rates exhausted from paint spraying booths, the incineration process requires vast expenditures of energy, thus rendering this solution very costly to implement.

Another alternate approach which has been attempted and considered in this context is the use of adsorber beds such as of activated charcoal, over which the exhaust air is passed for direct adsorption of the solvent vapors, thus enabling their elimination from the exhaust air.

Again, the enormous air volumes in automotive production and similar applications and the need to regenerate the adsorber beds render this approach extremely expensive.

Yet another approach which has been proposed involves the replacement of the hydrocarbon solvent based paint with water based paint, the elimination of vapors thus enabling direct discharge of the exhaust air to the atmosphere, after filtration or other treatment of the air to remove the paint solids.

While effective in this regard, the water based paints require close control over the temperature and humidity of the air supplied to the booth, with air cooling and dehumidification during summertime, and heating and humidification during wintertime operation. This requirement requires considerable capital investment and furthermore entails considerable energy to execute.

Accordingly, it is an object of the present invention to provide a system and process for the elimination of hydrocarbon vapors from the air exhausted from a paint spray facility in which the equipment required is relatively modest and in which the energy expended in the process is relatively modest.

SUMMARY OF THE INVENTION

This and other objects of the present invention, which will become apparent upon a reading of the following specification and claims, are achieved by a system and process associated with the paint spray booth recovery system wherein the exhaust air is treated by being passed over a water circulation system such as to remove the paint solids from the air, and which water flow partially absorbs the hydrocarbon vapors.

Solvent stripping is executed both on the water, after the filtration and removal of the paint solids, and also on the exhaust air after it has passed through the water circulation system to remove the paint solids.

The air stripping operation comprises directing the exhaust air through an absorber liquid spray scrubber in which the solvent is absorbed by an absorber liquid sprayed into the exhaust air stream.

The hydrocarbon absorber liquid is regenerated by a heating process to drive off the solvent prior to recirculation into the absorber liquid spray scrubber.

The heating process preferably utilizes heat generated in a fume incinerator associated with the paint drying ovens, in which a portion of the incinerated air exhausted from the incinerator is passed through a heat exchanger, over which the absorber liquid is sprayed in order to drive off solvents and allow the absorber liquid to be regenerated.

The hydrocarbon vapors driven off from the absorber liquid are condensed on cooling coils disposed in a condensing chamber and recovered in a suitable recovery vessel. The remaining uncondensed vapors are drawn out of the condensing chamber into the incinerator.

The removal of the hydrocarbons in the water is achieved by circulation of the water downstream of the solids removal equipment through a region in which a vacuum is applied to reduce the pressure above the water flow to a point whereat the solvents are vaporized into the region. The vapors are then condensed in a condensing chamber by being passed over cooling coils while the chamber itself is purged of the uncondensed vapors and the collected vapors from the chamber are drawn into the incinerator.

The water is circulated through a double standpipe into the condensing chamber with the elevation of the standpipe enabling the vacuum to be applied to allow free flow of the water through the standpipe.

The double standpipe includes a central pipe disposed within a larger diameter outer standpipe, with the water circulating up the annulus between the inner and outer standpipe and thence over and into the open end of the inner standpipe.

A refrigeration unit is employed to produce the necessary cooling liquid flow through the respective cooling coils, and the refrigeration unit also operates to dump the heat extracted during condensation of the vapors into the air exhaust during summertime conditions and to preheat the incoming air during wintertime conditions, thus recovering heat and saving energy.

DESCRIPTION OF THE DRAWINGS

The FIGURE is a diagrammatic representation of the various installation of a paint application facility and the associated hydrocarbon elimination components comprising the system according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The system disclosed herein has particular application to the paint spray booth of the type including the use of a water flooded floor beneath the paint spray booth in which the paint spray operations are conducted and in which the air is drawn over the water and exits through tubes into a subpan beneath the floor of the spray booth.

The air passing through water flowing through the tubes causes the solids in the paint, i.e., the pigments, resin and other components, to be removed frm the air and become suspended within the water flow. Such an arrangement is disclosed in U.S. Pat. No. 3,421,293 to Halls.

In order to remove the paint solids from the circulated treatment water, arrangements have been provided for collecting the paint solids and removing them from the water flow, as by causing them to raft on the surface of a collecting tank. Such an arrangement is disclosed in U.S. Pat. No. 4,100,066 to Bloomer et al.

The particular composition of paint used in automotive production and similar processes varies with the particular requirements and with the particular manufacturer of the paint. However, a number of hydrocarbon liquids are usually included, as solvents, thinners and diluents, some of which are typically soluble in water and others of which are not.

Accordingly, in passing over the water in intimate contact therewith, the air exhausted from the spray booth tends to cause a proportion of the solvent vapors contained in the exhaust air to go into solution into the circulated treatment water. The remaining undissolved vapors pass out with the exhaust air.

Thus, if the composition of the paint is such that a significant proportion of the liquid constituents are water soluble, such water flow treatment utilized in the spray booth air exhaust system itself represents means for partially eliminating the hydrocarbon vapors.

On the other hand, the recirculated water cannot continue to indefinitely pick up the hydrocarbon compounds and some means must be provided for their elimination from the circulated water.

In the past, such elimination has beem difficult due to the presence of the paint solids. In addition, due to the high specific heat of water and the large volumes required, the conventional process of heating the water to drive off the vapors is rendered impractical, as a result of the enormous heat energy which would be required.

The system and process according to the present invention is thus contemplated as advantageous for use in paint spray booths of the type having a water flow treatment of the air exhausted, with equipment of the general type described in the aforementioned Bloomer et al patent for removal of the paint solids; and, for use with paint compositions having a major or substantial proportion of the water soluble hydrocarbon solvents.

Referring to the drawings, this is depicted in which a paint spray booth 10 is represented, comprising an enclosure within which an auto body shell 12 or other component is painted during production. The air supplied for ventilation is received via ducting 14 and caused to be circulated by means of a supply blower 16.

A wintertime heat exchanger 17 is provided, for purposes to be described, and the inlet duct 19 receives fresh air from the building exterior.

The air passes through a grate 18 disposed across the floor of the paint spray booth 10 and thence over a flooded subfloor 20 which receives water flow via supply line 22. The water over the subfloor 20 tends to partially collect the overspray during paint spraying operations, which settles into the water. The air with the balance of overspray, particularly fine particles, is circulated out through longitudinally spaced outlet tubes 24 through which the water from the floor 20 flows. An intense scrubbing action of the air occurs in the tubes and the paint is transferred to the water which flows into a collecting pan 26.

The exhausted air, after passing through the outlet tubes 24 and having the paint solids thereby substantially removed, passes out through an exhaust duct indicated at 28 and thence passes through an exhaust air hydrocarbon vapor stripper 30, which will be described hereinafter in further detail, and thence directed to the exhaust by an exhaust blower 32 to an outside stack 34. A heat exchanger 36 is also provided, for purposes to be described.

The water entraining the paint solids and having a proportion of hydrocarbon solvents dissolved therein passes into collecting flumes 38 from which it is withdrawn through lines 40 and 42 to be directed to a paint solid removing apparatus 44. This design is contemplated to be of the type described in the aforementioned Bloomer et al. patent and consists of a first collecting chamber 46 which receives the paint solid containing water and causes collecting of the paint solids which are periodically removed.

A level control tank 48 is also provided which causes the water to be introduced into the interior of the removing apparatus 44 in order to maintain the appropriate levels to conduct the removal process.

The return line 50 recirculates the water via pump 52 onto the spray booth subfloor to enable continuous execution of the process. Thus, the air exhaust through the exhaust duct 28 is substantially free from paint solids but does contain dissolved hydrocarbon constituents.

Similarly, the water in level control tank 48, while having the solids substantially removed therefrom, still contains the dissolved hydrocarbons. The solvent levels must be reduced in order to prevent an excessively high build up in the circulated water.

Also, integrated into the system and process, according to the present invention, is a diagrammatic representation of a paint curing oven 54 in which air is heated and passed to maintain the temperature at a suitable high level for proper paint drying. The air is withdrawn into a ceiling duct 56, and thence circulated through a fume incinerator 58.

This arrangement has been employed and includes an exhaust blower 60 which draws air upward through louvers 62 and thence through the ceiling duct 56 and through exhaust duct 64.

The exhaust flow is redirected through a supply fan 66 and a plenum 68 into the interior of paint curing oven 54. A portion of the exhaust flow is drawn off by the exhaust blower 60, and passed through an air-to-air heat exchanger 70 which preheats the air by incinerated air exiting from an incinerator chamber 72. The preheated air enters the inlet 126 of the incinerator chamber 72 via duct 128. After passing through the incinerator chamber 72, a portion of the incinerated air is received by the inlet of supply fan 66 through duct 74.

The incinerator design is of a type as shown in U.S. Pat. No. 3,917,444 to Carthew.

A second air-to-air heat exchanger 76 provides an exchange of heat between fresh, make up air introduced through ducting 78 and the remaining incinerated air flow vented to the atmosphere through vent 80.

The process according to the present invention envisions the removal of solvent from the exhausted air after passing into the exhaust duct 28 and removal of the paint solids and also from the water after solids removal and return to the level control tank 48. As mentioned previously, the elimination of hydrocarbon vapors from the air is achieved in an air stripper 30 in which absorbing liquid is circulated via pump 82 through a bank of spray nozzles 84.

The air passes through a coalescing matrix 86 carrying the liquid mist which acts to cause the liquid droplets to coalesce into larger droplets and which also provides additional opportunity for air contact in order to enable more complete absorption of the hydrocarbon vapors.

After passing through the coalescing matrix 86, a series of baffles 88 cause the now larger sized absorber liquid droplets to be eliminated from the air stream, collected in a collecting compartment 89 to enable the liquid to be directed to the return side of the circulation pump 82.

The air thence is directed to a vent by exhaust blower 32 as indicated previously.

Since the absorbing liquid cannot safely be allowed to be continued to absorb indefinitely the hydrocarbon vapors, a regeneration arrangement is provided in which a portion of the absorbing liquid is circulated through a regenerator loop 90 which includes an inlet line 92 receiving the solvent laden absorbing liquid which passes through a liquid-to-liquid heat exchanger 94. This causes the liquid to be preheated by returning absorbing liquid which is heated in the regeneration process previously described.

The heat required to drive off the solvent in the absorbing liquid is relatively modest since the volume of absorbing liquid is relatively low compared to the circulation of water, as well as due to the low specific heat of the absorbing liquid.

To further maximize the efficiency of the process over that gained by the use of the liquid-to-liquid heat exchanger 94, the regeneration process is integrated with the fume incinerator, which is associated with the paint curing oven 54.

The absorbing liquid is passed through regeneration supply line 96 and is sprayed through a series of nozzles 98 over high temperature heating coils 100 which heating coils receive the incinerated air vented via vent 80, after leaving the incinerator chamber 72 after being passed through the air-to-air heat exchangers 70 and 76. Thus, the heat of the incinerator is partially recovered to be utilized for regeneration heat. A recirculating pump 102 causes recirculation of the regenerated absorbing liquid back to the supply side of the pump 82.

The vapors driven out of the absorbing liquid by contact of the liquid with the heating oil 100 are condensed in condensing chamber 104 by contact with the cooling coil 106 disposed in a collection compartment 107 and receiving a flow of chilled liquid via lines 108 circulated around the expansion side 100 of a mechanical refrigeration unit generally indicated at 112. Collection compartment 107 is provided with a drain line 114 communicating with a recovery tank 116.

Condensing chamber 104 maintains a relatively low vapor pressure of the solvents and other hydrocarbon compounds to maximize vaporization out of the absorbing liquid. the condensing chamber 104 is preferably put under a partial vacuum by means of a vacuum pump 118 having an inlet line 120 including a pressure regulating valve 122, which develops a low controlled pressure in condensing chamber 104.

The outlet 124 communicates with the inlet 126 side of the incinerator chamber 72 such that the hydrocarbon vapors pass into the incinerator chamber 72 and are incinerated with the vapor carrying air received from the outlet side of the air-to-air heat exchanger 70.

Accordingly, it can be seen that a high efficiency removal of the hydrocarbon vapors in the air is achieved by this arrangement. Firstly, in that only a portion of the total vapor content of the air initially need be removed due to the passing into solution of a substantial portion of the vapors into the water bath with the collecting water. In addition, the absorbing liquid spray is suited to handle relatively large volumes of air which relatively modest quantities of absorbing liquid, which liquid is comparatively easily regenerated in order to provide a steady state process even for the enormous volumes of air flow usual in these installations.

The regenerator arrangement itself is highly efficient utilizing the liquid-to-liquid heat exchanger 94 and the use of heat generated by the fume incinerator 58. By comparison to prior art approaches, the capital investment required is quite modest, as are the energy requirements in carrying out the process.

Referring to the solvent water scrubber portion of the system and process, in which the solvent is removed from the circulated water, the system concept envisions the application of a vacuum above the water as it circulates such as to cause the direct vaporization of the hydrocarbon compounds during its passing into a condensing chamber due to the consequent low vapor pressure of these compounds existing in the chamber. The chamber is continuously purged such as to maintain a relatively low vapor pressure and thus purify the circulated water without heating of the water mass itself.

It can be shown that the vaporization rate produced by the pressure reduction is at a level corresponding to a considerably elevated temperature of the solution, such that the solvent vapor will be readily achieved.

The particular arrangement for achieving the application of the vacuum includes an outer standpipe 130 of relatively large diameter, the lower end of which extends into level control tank 48. Within the interior of the large diameter outer standpipe 130 is a relatively smaller diameter inner standpipe 132 with a clearance space therebetween enabling the water to flow up the outer standpipe 130 and down the inner standpipe 132.

The large diameter outer standpipe 130 is of greater height than the inner standpipe 132 is indicated, such that the water is contained therein as it passes into the interior of the inner standpipe 132 while flowing exposed to the interior of the condensing chamber 134.

The condensing chamber 134 is evacuated by the connection via line 136 across the branch connection 138 and pressure regulation valve 140 to produce a vacuum pressure on water flowing through the standpipes 130 and 132.

The height of the standpipes 130 and 132 is selected to correspond to the vacuum interposed on the condensing chamber 134, i.e., full vacuum of the corresponding pressure head would be approximately 33 feet of water such that the water will be subjected to the low vacuum without causing it to be drawn into the interior of the condensing chamber 134.

This relatively low pressure in condensing chamber 134 produces a greatly enhanced tendency for the dissolved hydrocarbons to vaporize, while the water, having much less tendency to vaporize, will evacuate into the condensing chamber 134 to a much lesser extent so as to be present in relatively inconsequential quantities. The hydrocarbon vapors are condensed by cooling coils 142 supplied with cooled heat transfer medium flowing via line 150 and which are disposed in the condensing chamber 134 to cause the vapor to be condensed into liquid form and collected in the compartment 144.

The collected liquid passes into drain line 146 and to a recovery vessel 148.

The continuous purging of the interior of the condensing chamber 134 via line 136 insures the relatively low vapor pressure of the hydrocarbons in the chamber to maximize vaporization thereof.

The liquid level control tank 48 may also have a slight vacuum applied to the region above the water level by a condensing chamber 152 provided with a vent tube 154 supplied with a connection drain line 156 to the recovery tank 148 and a branch line to the vacuum pump 118. A cooling coil 153 is provided in the condensing chamber 152 and supplied with a flow of cooled heat transfer medium via line 150.

A relatively slight vacuum is applied to enable the free flow of liquid into and out of the condensing chamber 152 while collecting the vapors which may accumulate above the water level, which slight vacuum is set by the pressure control valve 158.

In order to maximize the efficiency of the use of refrigeration unit 112, the heat exchanger 36 receives a flow of a heat transfer medium circulated about the condenser coils in condenser 160 in order to transfer heat by operation of the compressor 162 from the expansion side 110 in turn picked up from the condensation of the solvent vapors in the respective condensing chambers 104, 134 and 152 into the exhaust air which is relatively cool during summer conditions.

During winter conditions, the heat is pumped into heat transfer unit via the heat exchanger unit 17 such as to prewarm the incoming air and enhancing the efficiency of the process to this extent.

Accordingly, it can be seen that a relatively efficient elimination of the hydrocarbon vapors from the air developed as a result of the paint spraying operation is achieved by a simple arrangement for removing these compounds both from the air and from the paint solid collecting water circulation flow and which accommodates the high volume of air flow without excessively high energy consumption in so doing.

The operative components thereof operate in a highly reliable manner as well as optimizing the utilization of such energy requirement as is needed in execution of the process. While the system is shown having particular application to particular componentry associated with the paint spraying and drying operations specifically, it is of course understood that the inventive concept could be applied to other systems.

The embodiments of the invention in which an exclusive property or privilege is claimed are defined as follows:

1. An air handling system for a paint applying enclosure wherein hydrocarbon solvent base paint application processes are conducted, said air handling system comprising:
   air inlet supply means introducing a flow of fresh air into said enclosure;
   air exhaust means causing an exhaust air flow from said enclosure, said exhaust means including paint solid removal means for removing the paint solids from said exhausted air flow;
   vapor removal means receiving said exhaust air flow after passing through said paint solid removal means and for stripping said exhaust air of hydrocarbon vapors and
   including means for producing contact between a hydrocarbon-absorbing liquid and the exhaust air;
   means for venting said exhaust air flow after contact with said liquid;
   regenerator means for removing absorbed hydrocarbons from said absorber liquid; and means for recirculating regenerated absorber liquid to said means for producing contact.

2. The air handling system according to claim 1 wherein said means for producing hydrocarbon-absorber liquid contact comprises an absorber liquid spray means directing absorber liquid as a spray into said exhaust air flow.

3. The air handling system according to claim 2 wherein said means for producing hydrocarbon-absorber liquid contact further includes a coalescing matrix receiving said exhaust air absorber liquid spray mixture through small openings formed therein causing said absorber liquid spray droplets to coalesce and providing an additional opportunity for absorption of said hydrocarbon vapors by said absorber liquid.

4. The air handling system according to claim 3 wherein said means for producing hydrocarbon-absorber liquid contact further includes a baffle array through which said exhaust air passes after passing through said coalescing matrix, causing separation of said liquid droplets from said exhaust air flow and further including a collecting compartment collecting said separated liquid and said means for recirculating including means for recirculating a portion of said collected liquid to said spray means and a portion to said regenerator means.

5. The air handling system according to claim 4 wherein said regenerator means includes a condensing chamber and also including a spray means disposed in said condensing chamber, and a high temperature coil disposed in said condensing chamber disposed to be impinged by spray from said spray means and means for heating said high temperature coils to cause vaporization of said absorbed hydrocarbons therefrom upon being heated by passing into contact with said high temperature coils; and, further including condensing means disposed in said condensing chamber comprising a cooling coil disposed thereon and means for cooling said cooling coils and including a collection compartment adjacent said cooling coils, further including drain means for draining said condensed hydrocarbons therefrom.

6. The air handling system according to claim 5 wherein said regeneration means further includes means for purging said condensing chamber of said hydrocarbon vapors driven out by heating of said spray and further including incinerator means for incinerating said purged vapors.

7. The air handling system according to claim 6 wherein said means for heating comprises said incinerator means.

8. The air handling system according to claim 7 wherein said means for cooling said cooling coils includes means circulating a heat transfer medium therethrough and means transferring heat out of said circulated medium, and wherein said air handling system further includes summertime heat exchanger means receiving said air vented from said means for producing contact and connected to said means transferring heat so as to transfer a portion of the heat transferred out of said circulated medium into said vented air during summertime operating conditions.

9. The air handling system according to claim 8 further including wintertime heat exchanger means receiving said air supply into said enclosure and wherein said wintertime heat exchanger means is connected to said means for transferring heat so as to transfer the heat transferred out of said circulated medium into said inlet supply air during wintertime operation, whereby said air supply is preheated.

10. The air handling system according to claim 1 wherein said means removing said paint solids includes a water flow system washing said exhaust air flow, and includes means for collecting said water flow after being passed in contact with said exhaust air flow; means for removing said paint solids from said water and recirculating said water into said water flow system; water stripper means for removing dissolved hydrocarbon compounds from said recirculated water prior to recirculation thereof.

11. The air handling system according to claim 10 wherein said water stripper means comprises means for applying a vacuum pressure to said collected water after removal thereof of said paint solids and further including means for condensing hydrocarbon vapors created by said application of said vacuum pressure thereon.

12. The air handling system according to claim 11 wherein said water stripper means comprises a condensing chamber wherein said vacuum pressure is developed and means for circulating said water flow through said chamber.

13. The air handling system according to claim 12 wherein said means for condensing said hydrocarbon vapors comprises a cooling coil located in said condensing chamber and further including means for circulating a chilled heat transfer medium through said cooling coil, and further including a collecting compartment formed in said condensing chamber adjacent said cooling coils and enabling collection of said condensed hydrocarbon vapors therefrom; and drain means collecting said condensed hydrocarbons from said collecting compartment.

14. The air handling system according to claim 13 wherein said means for applying a vacuum pressure in said condensing chamber further includes vacuum pump means withdrawing vapors from said condensing chamber.

15. The air handling system according to claim 12 wherein said means for circulating said water flow through said condensing chamber includes a large diameter outer standpipe of a predetermined height and means for passing said water flow into said standpipe, said upper end of said standpipe being opened and disposed within said condensing chamber; an inner standpipe of lesser height than said outer standpipe disposed within said outer standpipe with a clearance space therebetween; means for causing said circulated water to pass between said clearance space therebetween, while being contained by said outer diameter standpipe, whereby said standpipe predetermined height enables said vacuum pressure to be applied to said water while enabling free flow thereof through said outer and inner standpipes.

16. The air handling system according to claim 15 further including incinerator means receiving vapors withdrawn from said condensing chamber by said means applying a vacuum pressure and said incinerator means including means for incinerating said withdrawn hydrocarbon vapors.

17. The air handling system according to claim 14 wherein said cooling coil and means for circulating a chilled heat transfer medium comprise refrigeration means and means for transferring heat out of said medium to be chilled thereby and further including summertime heat exchanger means receiving said exhaust air vented from said means for producing contact and wherein said refrigeration means includes means transferring heat from said medium circulated through said cooling coil into said summertime heat exchanger means during summertime conditions, whereby heat energy absorbed by said medium in condensing said hydrocarbon vapors is dumped into said vented air during summertime conditions.

18. The air handling system according to claim 17 further including winter heat exchanger means receiving said inlet supply air and receiving heat transferred out of said medium circulated through said cooling coil in said refrigeration means into said inlet supply air during wintertime conditions.

19. The air handling system according to claim 10 wherein said paint solid removing means includes a water level control tank and further including means for collecting hydrocarbon vapors developed in said water level control tank.

20. A method for removing hydrocarbon vapors from the exhaust air of a paint spray booth comprising the steps of:
(a) removing the majority of any paint solids from the exhaust air;
(b) passing the exhaust air through a spray of absorber liquid having an affinity for hydrocarbons thereby removing the hydrocarbon vapors from the exhaust air;
(c) exhausting the air;
(d) heating the absorber liquid to vaporize the hydrocarbons therein, and
(e) recirculating the absorber liquid for use in the spray operation.

21. The method defined in claim 20 wherein the step of heating the absorber liquid is carried out at a reduced vapor pressure.

* * * * *

UNITED STATES PATENT AND TRADEMARK OFFICE
CERTIFICATE OF CORRECTION

PATENT NO. : 4,261,707
DATED : April 14, 1981
INVENTOR(S) : Norman F. Bradshaw and Ivan Bloomer, both of U.K.

It is certified that error appears in the above-identified patent and that said Letters Patent are hereby corrected as shown below:

Col. 1, line 13, "automative" should be --automotive--. Col. 1, line 21, "ciculated" should be --circulated--. Col. 2, line 66, "installation" should be --installations--. Col. 3, line 20, "frm" should be --from--. Col. 5, line 65, "oil" should be --coil--. Col. 6, line 1, "100" should be --110--. Col. 6, line 26, "which" should be --with--. Col. 9, line 17, after "said means" insert --for--.

Add the following claim:
-- 22. A method for removing hydrocarbon vapors from the exhaust air of a paint spray booth comprising the steps of:
(a) removing the majority of any paint solids from the exhaust air; (b) passing the exhaust air through a finely divided atmosphere of absorber liquid having an affinity for hydrocarbons thereby removing the hydrocarbon vapors from the exhaust air; (c) exhausting the air; (d) separating the adsorbed hydrocarbons from the absorber liquid, and (e) recirculating the absorber liquid for use in removing additional hydrocarbon vapors from the exhaust air--.

Signed and Sealed this

Fifteenth Day of December 1981

[SEAL]

Attest:

GERALD J. MOSSINGHOFF

Attesting Officer  Commissioner of Patents and Trademarks